Figure 1:
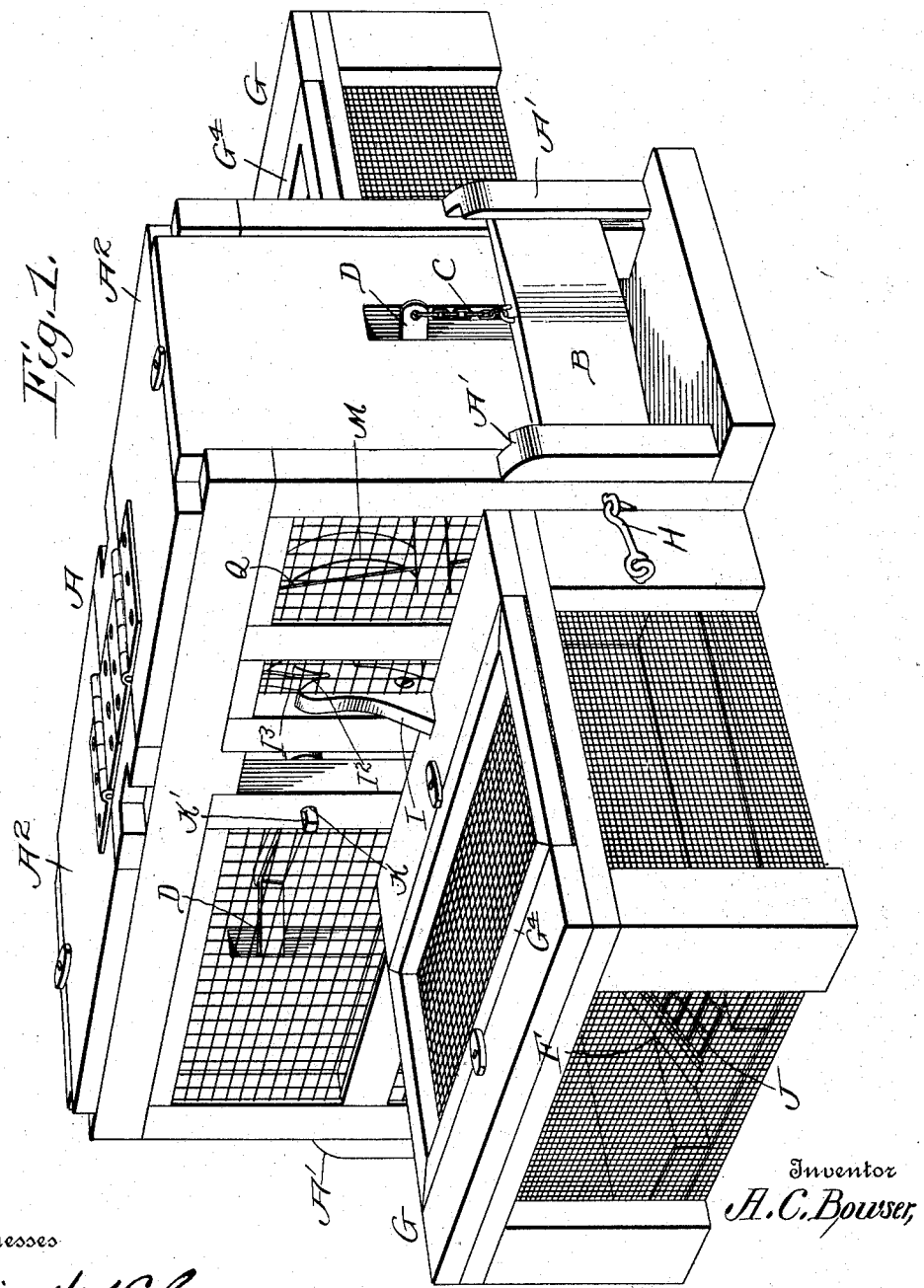

A. C. BOWSER.
ANIMAL TRAP.
APPLICATION FILED DEC. 5, 1910.

1,015,471.

Patented Jan. 23, 1912.
4 SHEETS—SHEET 1.

Witnesses

Inventor
A. C. Bowser,
By Chas E Brock
Attorney

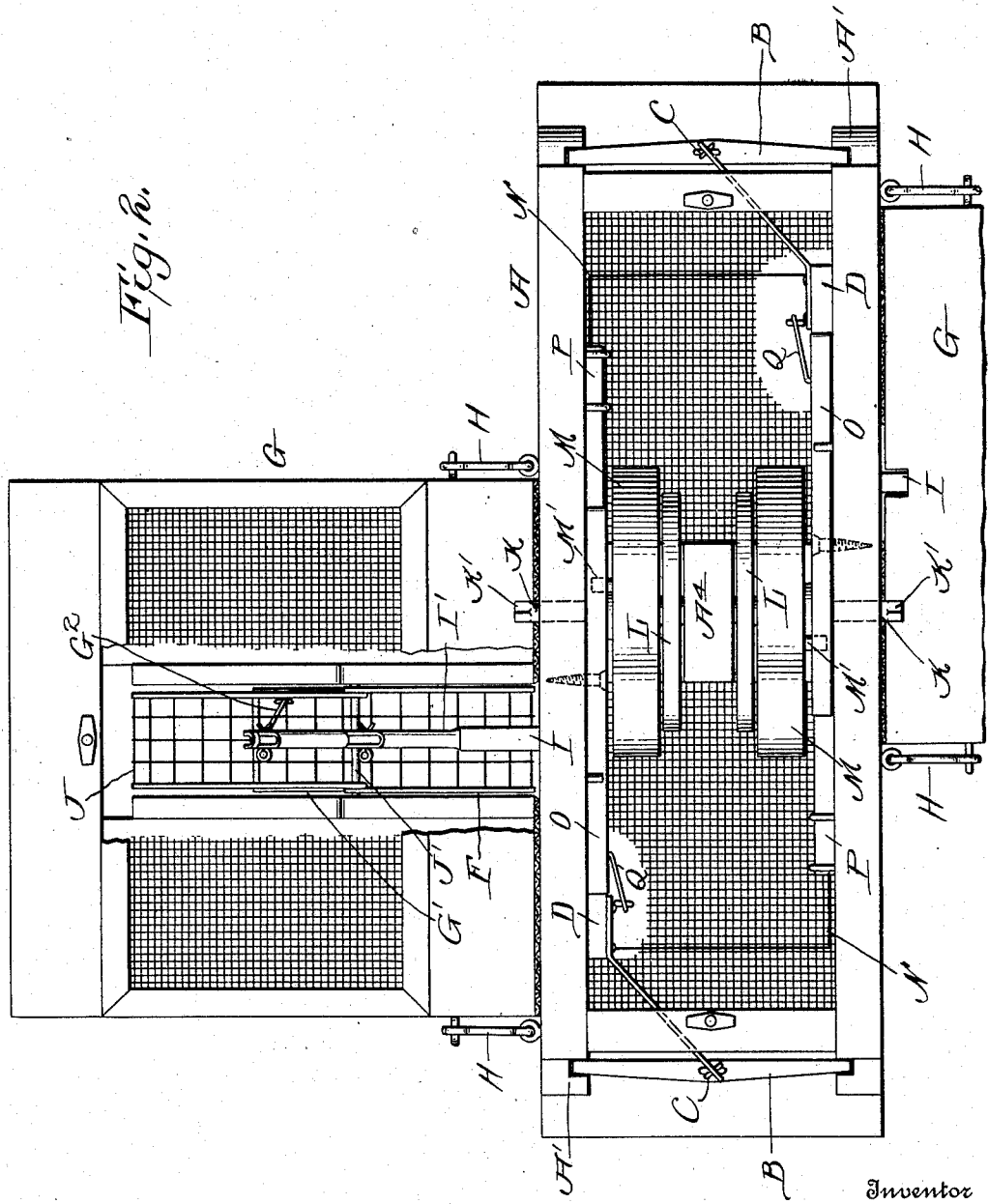

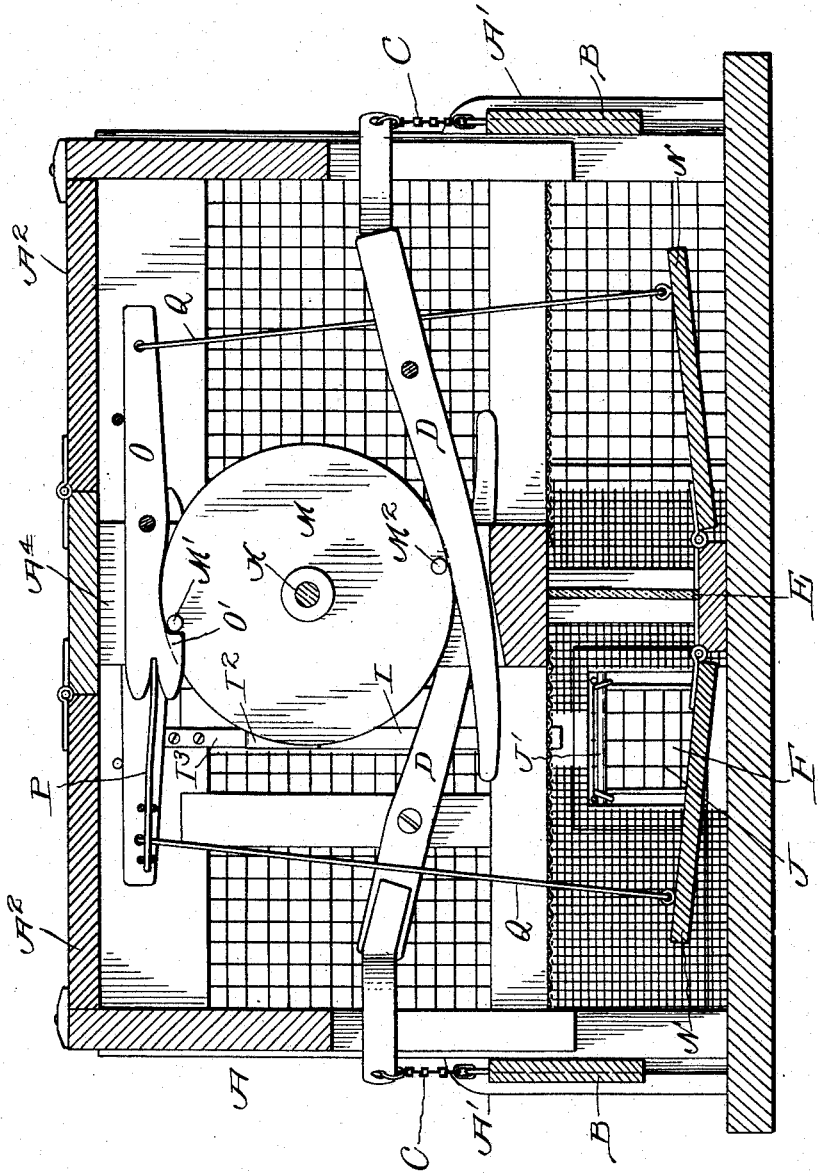

A. C. BOWSER.
ANIMAL TRAP.
APPLICATION FILED DEC. 5, 1910.
1,015,471.
Patented Jan. 23, 1912.
4 SHEETS—SHEET 4.
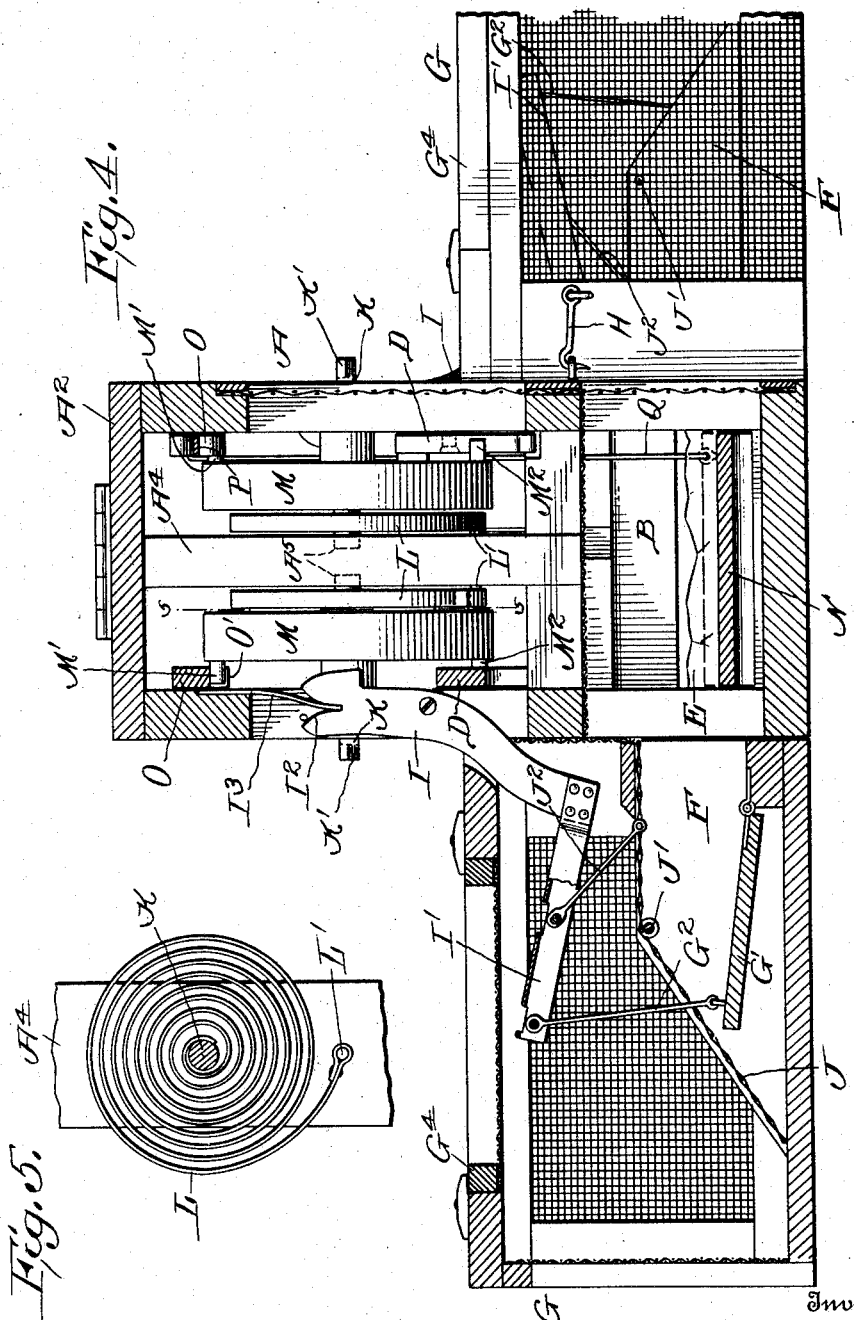

UNITED STATES PATENT OFFICE.

ANTHONY C. BOWSER, OF MURPHYSBORO, ILLINOIS.

ANIMAL-TRAP.

1,015,471.  Specification of Letters Patent.  Patented Jan. 23, 1912.

Application filed December 5, 1910. Serial No. 595,689.

*To all whom it may concern:*

Be it known that I, ANTHONY C. BOWSER, a citizen of the United States, residing at Murphysboro, in the county of Jackson and State of Illinois, have invented a new and useful Improvement in Animal-Traps, of which the following is a specification.

This invention relates to certain new and useful improvements in animal traps, and more particularly to that class known as victim-set traps, whereby a great number of rats can be caught by the same without resetting the trap.

A still further object of my invention is to provide a trap which is provided with a main cage having two compartments and auxiliary cages communicating with the respective compartments, whereby the rats after entering the compartment of the main cage pass into the auxiliary cage.

Another object of my invention is to provide novel tripping means which is so constructed that the animal trips the same as he enters the main cage, and as he enters the auxiliary cage he trips a trip plate which resets the trap.

With these objects in view, the invention consists in the novel features of construction, combination and arrangement of parts, hereinafter fully described and pointed out in the claims.

In the drawing forming a part of this specification:—Figure 1 is a perspective view of my improved trap showing the same in a set position. Fig. 2 is a top plan view of the same partly broken away so as to show the operating mechanism. Fig. 3 is a longitudinal vertical section through the trap. Fig. 4 is a transverse vertical section partly broken away. And Fig. 5 is a section taken on line 5—5 of Fig. 4.

In carrying out my improved invention, I employ a main cage A which is divided horizontally into a lower rat receiving compartment and an upper mechanism receiving compartment, and said rat receiving compartment is provided with a door opening at each end having guide members $A'$ in which are slidably mounted doors B having chains C connected to their upper ends which are carried by levers D pivotally mounted within the upper compartment as clearly shown. The lower compartment is divided centrally into two compartments by a pane of glass E, whereby the animal entering either end will see the opposite door, and the upper compartment is provided with hinged covers $A^2$ as clearly shown so as to allow the mechanism installed therein which will be later described to be reached in order to repair the same if necessary.

Each of the lower compartments formed by the dividing wall of glass is provided with an exit which communicates with a run way F of an auxiliary cage G, one of which is arranged upon each side of the main cage, and is secured thereto by hooks and eyes H, whereby the same can be easily attached or detached. These cages are formed exactly alike, and the description of one is sufficient for both. Each cage G is provided with a pivoted tread plate $G'$ mounted within the run way F, and to which is connected a link $G^2$ which has its upper end pivotally connected to the arm $I'$ of a pivoted latch I which is mounted within an opening formed in the side of the main cage A, and is provided with a bifurcated end $I^2$ into which extends a flat spring $I^3$ for normally holding the same in the position shown in Fig. 4, whereby the tread plate $G'$ will be held in a raised position. The run way F is covered by a drop frame J which is pivotally mounted at $J'$ and is connected to the frame $I'$ by a lever $J^2$, whereby the same will be raised by the arm I when the animal treads upon the plate $G'$ in order to allow the animal to enter the auxiliary cage from the run way.

The upper compartment of the main cage is provided with a central vertical post $A^4$ having bearings $A^5$ in its opposite sides in which are revolubly mounted the inner ends of shafts K which are provided with key receiving portions $K'$ at their outer ends, and said shafts being mounted in suitable bearings on the side walls of the main cage. Secured on each of the shafts K is a clock spring L, the inner end of which is connected to the shaft and the outer end to a pin $L'$ as clearly shown in Fig. 5. Secured to each shaft K is a disk M which is provided with oppositely disposed laterally projecting pins $M'$ $M^2$ adapted to co-act with the lever D and a shoulder formed on the latch I as will be later described.

Arranged within the rat receiving compartments of the main cage are tread plates N which are supported in a raised position by pivoted latches O which are provided with shoulders $O'$ co-acting with the pins $M'$ $M^2$, and held in the path of the same by a flat spring P as clearly shown in Fig. 3. The latch O is connected to the tread plate N by a rod Q, and it will be seen that as the animal enters either of these compartments the tread plate will be compressed by its own weight which will release the spring actuated disk M so as to allow the same to oscillate, whereby the lever D will be released so as to allow the door to drop and inclose the animal therein.

It will be seen that I have provided duplicate mechanism for operating the doors and trip plates of the main cage and auxiliary cage, whereby each plate operates independently. The side cages are provided with removable covers G⁴ in order to allow the rat to be removed.

The operation of my improved trap is as follows:—Supposing that the trap is in a set position as shown at Figs. 1, 3 and 4, as the rat enters one of the openings at the end of the main cage and steps upon the trip plate, the latch within releases one of the pins of the disk so as to allow the same to oscillate until it is caught by the shoulder of the latch I, and it will be seen that the lever D will be released by the pin so as to allow the door to drop in order to close the door opening. The rat being held within the compartment in this manner, passes into the run-way of the auxiliary compartment, and as it steps upon the tread plate G' the latch I is thrown out of engagement with the pin which allows the disk to oscillate in order to bring the opposite pin into engagement with the lever D which raises the same so as to open the door and reset the trap, and it will be seen that this operation is repeated as each rat enters the trap and passes into the auxiliary cage.

What I claim is:—

1. A device of the kind described comprising a main cage having a door at each end, a transparent transverse partition in said cage, auxiliary cages arranged upon opposite sides and adjacent opposite ends of said main cage, the auxiliary cages communicating with the main cage upon opposite sides of said partition, means for closing the doorway of the main cage upon entrance of an animal therein, and means for opening said doorway upon passage of the animal into one of said auxiliary cages.

2. A device of the kind described comprising a main cage, said cage having doorways at each end, a glass partition dividing said cage into two compartments, said partition being arranged between said doorways, slidable doors, said doors being normally elevated, means arranged upon each side of the partition for closing one of said doors upon entering of an animal through either doorway, auxiliary cages detachably connected to the main cage and communicating therewith respectively upon opposite sides of said partition, and means carried by said auxiliary cages for elevating the closed door of the main cage upon passage of an animal from the main cage into either of the auxiliary cages.

3. The combination with a main cage having a sliding door, of an auxiliary cage provided with a run-way having a pivoted drop frame, of a lever mounted within said main cage connected to said door, a spring actuated disk provided with oppositely disposed pins engaging said lever, a pivoted latch coacting with the pins of said disk, a pivoted tread plate connected to said latch, a pivoted tread plate mounted within the run way of the auxiliary cage, and a latch operated by the last mentioned tread plate coacting with the pins of said disk, whereby said disk will be operated intermittingly as the animal passes over said tread plates.

ANTHONY C. BOWSER.

Witnesses:
W. C. LUCIEN,
H. CRAWFORD.

---

Copies of this patent may be obtained for five cents each, by addressing the "Commissioner of Patents, Washington, D. C."